United States Patent [19]
Ott et al.

[11] Patent Number: 5,937,121
[45] Date of Patent: Aug. 10, 1999

[54] ADAPTERS FOR COUPLING OPTICAL FIBER

[75] Inventors: Conrad L. Ott, Port Jefferson Station, N.Y.; Edward Volansky, Waterbury, Conn.

[73] Assignee: The Siemon Company, Watertown, Conn.

[21] Appl. No.: 08/775,998

[22] Filed: Jan. 3, 1997

[51] Int. Cl.⁶ .................................................. G02B 6/38
[52] U.S. Cl. .............................................. 385/59; 385/66
[58] Field of Search ........................... 385/147, 56, 59, 385/60, 66

[56] References Cited

U.S. PATENT DOCUMENTS

| | | | |
|---|---|---|---|
| 3,941,965 | 3/1976 | Piber | 200/296 |
| 4,167,303 | 9/1979 | Bowen et al. | 350/96.21 |
| 5,067,783 | 11/1991 | Lampert | 385/60 |
| 5,082,344 | 1/1992 | Mulholland et al. | 385/60 |
| 5,142,597 | 8/1992 | Mulholland et al. | 385/56 |
| 5,166,995 | 11/1992 | Briggs et al. | 385/58 |
| 5,297,227 | 3/1994 | Brown et al. | 385/56 |
| 5,317,663 | 5/1994 | Beard et al. | 385/70 |
| 5,333,222 | 7/1994 | Belenkiy et al. | 385/70 |
| 5,542,015 | 7/1996 | Hultermans | 385/60 |
| 5,563,971 | 10/1996 | Abendschein | 385/55 |
| 5,613,025 | 3/1997 | Grois et al. | 385/60 |
| 5,737,464 | 4/1998 | Underwood et al. | 385/72 |

*Primary Examiner*—Hung N. Ngo
*Attorney, Agent, or Firm*—Cantor Colburn LLP

[57] ABSTRACT

Adapters for coupling optical fiber. A first adapter includes ports for receiving optical fiber fitted with a first interface connector. The adapter includes first interface ports mounted to a block. The block has an outer dimension corresponding to a panel cut-out for a second interface adapter. Mounting clips may be preformed in the block. A second adapter includes a duplex retention latch including a first retention latch for receiving and gripping a first optical fiber connector and a second retention latch for receiving and gripping a second optical fiber connector. The first and second retention latches are joined by a connecting member integral with the first retention latch and the second retention latch. A third embodiment includes mounting clips that extend through openings formed in the adapter body.

38 Claims, 18 Drawing Sheets

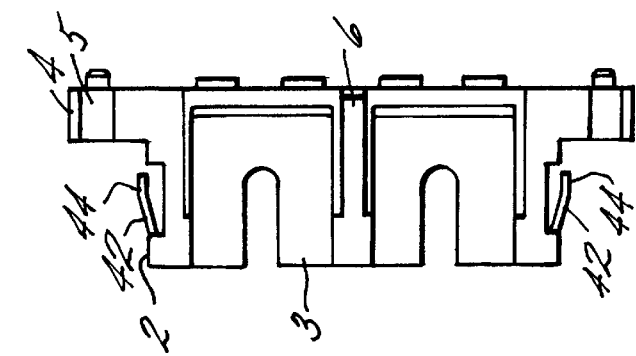
FIG. 7
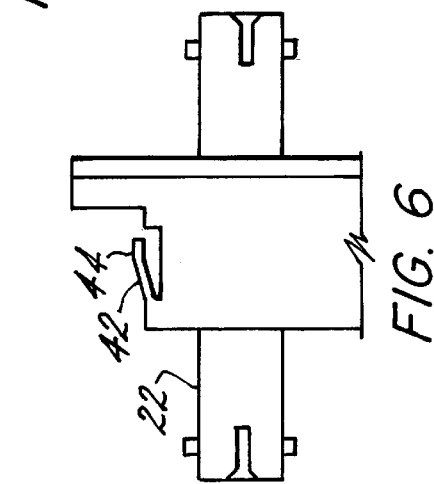
FIG. 6
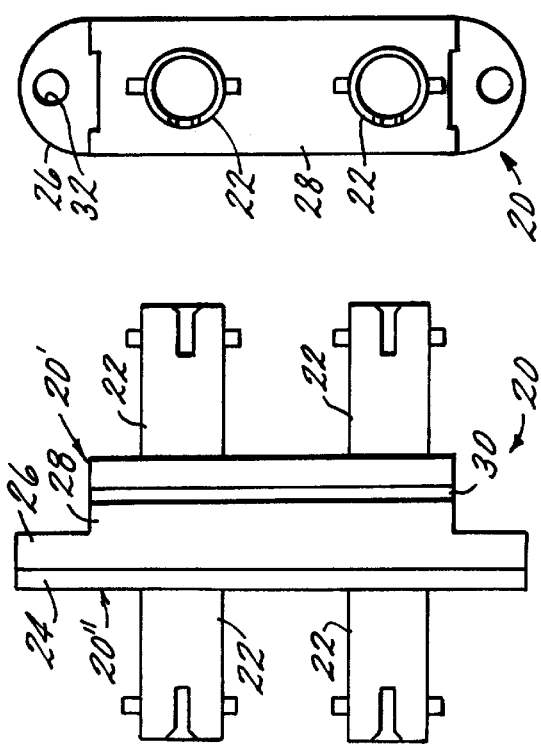
FIG. 4
FIG. 3
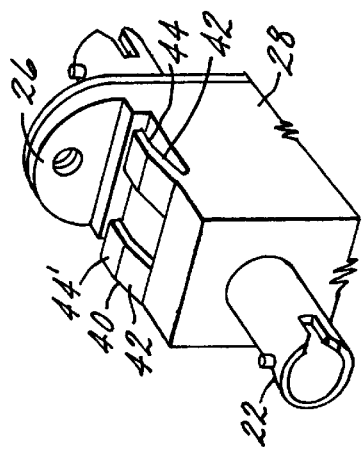
FIG. 5

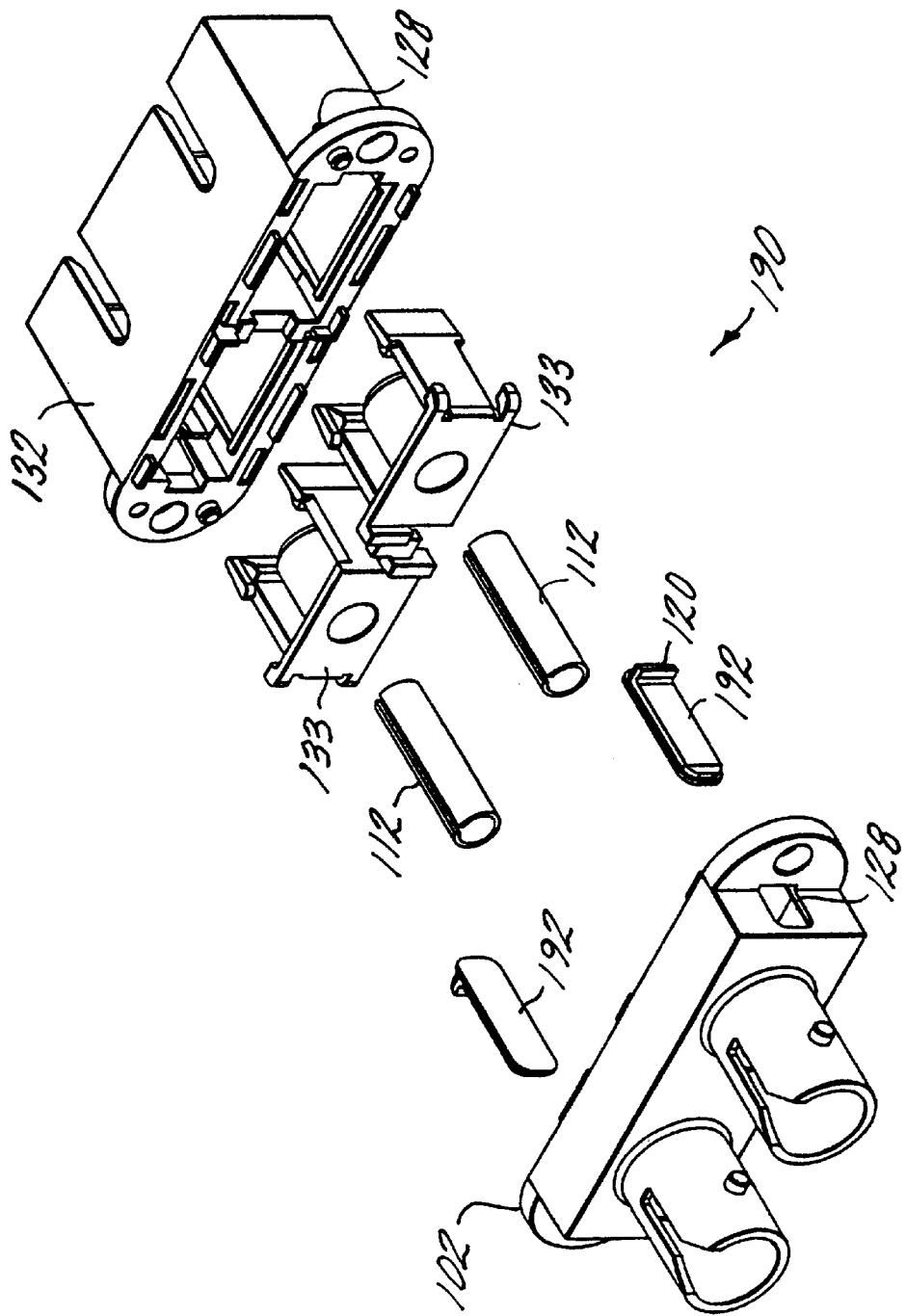

ADAPTERS FOR COUPLING OPTICAL FIBER

BACKGROUND OF THE INVENTION

1. Field of the Invention

The present invention relates generally to adapters for coupling optical fiber and in particular to adapters that facilitate panel mounting.

2. Prior Art

Fiber optic transmission is commonly effected through an optical fiber assembly consisting of a length of optical fiber and an interconnection including two connectors terminated on the optical fiber and then mated together via a female-to-female adapter. This interconnection facilitates testing along cable segments, enables re-routing, and facilitates changes in floor plans within a building. Especially in a Fiber-to-the-Desk application, the transmission is usually via a duplexed interconnection; i.e., the cable encompasses two fibers and the corresponding individual (simplex) connectors and adapters are linked together to form a double (duplex) interconnection.

There are two connector interfaces commonly utilized for data and telephone communication systems and their designations are ST and SC. The ST is a push-on/twist-lock interface. Most duplex ST adapters consist of two (2) identical, basically rectangular bodies which are welded together. The adapters are mounted through an oval or rectangular panel cut-out and are then retained to the panel via use of screws which fit through clearance holes in the adapter body's mounting flange and then threaded into tapped holes in the panel (on both sides of cut-out). The ST simplex adapter is cylindrical and the desired anti-rotation is typically effected via use of a flat (or flats) in the cylindrical mounting surface and a corresponding "D" (or "double-D") panel cut-out.

The SC is a push-on only connector. There is no locking mechanism other than retention latches that engage a connector which effect a retention that resists casual disengagement. Due to the inherent intramating differences, the means of attaching the adapters to a panel differ as well. The SC adapter is rectangularly shaped and, hence, the cut-out in the panel into which the SC adapter is to be mated is also rectangular. The SC adapter is rectangular-shaped and is typically retained within a rectangular panel cut-out (the size of which is larger than the oval/rectangular ST panel cut-out) via the use of separate, stamped and formed metallic (usually stainless steel) mounting "clips" which are attached to the adapter. The clip design is such that there is a retaining member on each side of the adapter and a flexible segment of each clip's retaining member collapses inwardly as the adapter passes through the panel cut-out and then snaps back to its original, outward position after it clears the panel thickness. In this position, the clips serve to retain the adapter within the panel. The other SC adapter mounting option is to use screws which fit through clearance holes in the adapter mounting flange and then thread into corresponding tapped holes in the panel (on both sides of the rectangular cut-out) in a similar manner to one of the ST mounting options.

Due to the differing mounting styles, the manufacturer of such products must design the products to include a panel cut-out for the ST and another panel cut-out for the SC. Producing two different types of panel cut-outs increases manufacturing costs and inventory requirements and complexity. Accordingly, there is a perceived need in the art for adapters that can fit into a single panel cut-out style.

Another problem encountered in the prior art is that the use of metallic mounting clips to mount the SC style adapter to the panel. These metallic mounting clips increase the cost of each unit and require additional assembly and inventory by the manufacturer.

FIG. 1A is a cross-sectional view of a conventional adapter body shown generally at 1. An "adapter" includes two "adapter bodies" that are joined together. The adapter body 1 includes an adapter housing 2 which is a generally rectangular housing having two separate adapter cavities 3. Ultrasonic energy directors 4a provide for mounting an adapter body 1 to another adapter body. The adapter body 1 includes a separating member 6 that isolates each of the adapter cavities 3. FIGS. 1B and 1C are front and rear views of the adapter body 1 shown in FIG. 1A. FIG. 2A is a cross-sectional view of a retention latch shown generally at 10. A retention latch 10 is placed within each of the adapter cavities 3 to hold a connector formed on the end of the optical fiber. The retention latch includes a pair of resilient fingers 12 that hold the connector in the retention latch 10. The fingers 12 include a tapered opening 14 that ease insertion of the connector into the retention latch 10. Each finger 12 includes a shoulder 16 that creates an interference fit with a portion of the connector. The fingers 12 grip a segment of the installed connector and retain the connector within the retention latch 10 so as to effect a withdrawal force of typically 3 pounds. A central conduit 18 includes a ferrule opening 20 that receives the tip of the connector. A retention latch opening 22 receives an alignment sleeve that aligns the ends of the optical fibers fitted to the adapter.

The prior art adapter uses simplex retention latches 10. Thus, an adapter assembly includes two adapter bodies 1, which are mounted face to face, and four simplex retention latches 10. Requiring four simplex retention latches 10 has several drawbacks. First, the manufacturer must stock additional parts which can become lost or damaged. Second, it takes a long amount of time to assemble the four simplex retention latches.

Another problem with the retention latches of the prior art is that the retention latches are not held in the adapter bodies firmly. When an assembler must transport the adapter body, including the retention latches, to a welding area for final joining of two adapter bodies, the retention latches may become misaligned or fall out of the adapter body.

SUMMARY OF THE INVENTION

The above-discussed and other drawbacks and deficiencies of the prior art are overcome or alleviated by the adapters for coupling optical fiber of the invention. In a first embodiment, the adapter is used for connecting fibers fitted with a first interface connector. One of the adapter bodies includes a first interface port mounted to a block. The block has an outer dimension corresponding to a panel cut-out for a second interface adapter. Mounting clips may be preformed in the block.

In a second embodiment of the invention, the adapter includes two duplex retention latches, each of which includes a first retention latch for receiving and gripping a first connector and a second retention latch for receiving and gripping a second connector. The first and second retention latches are joined by a connecting member integral with the first retention latch and the second retention latch.

In a third embodiment of the invention, the adapter includes two sleeves, two sleeve retainers and two adapter bodies. Mounting clips may be formed on one of the sleeve retainers, one of the adapter bodies or be separate components. The mounting clips extend through an opening formed in one of the adapter bodies and grip a panel to mount the adapter in a panel cut-out.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 3 is a side view of an adapter in a first embodiment of the invention;

FIG. 4 is a front view of the adapter shown in FIG. 3;

FIG. 5 is a perspective view of a variation of the adapter body shown in FIG. 3 including integral mounting clips;

FIG. 6 is a side view of the adapter including the adapter body shown in FIG. 5;

FIG. 7 is a side cross-sectional view of an SC adapter body including integral mounting clips;

FIG. 26 is an exploded perspective view of an adapter having separate mounting clips.

DETAILED DESCRIPTION OF THE INVENTION

Figure 1C:
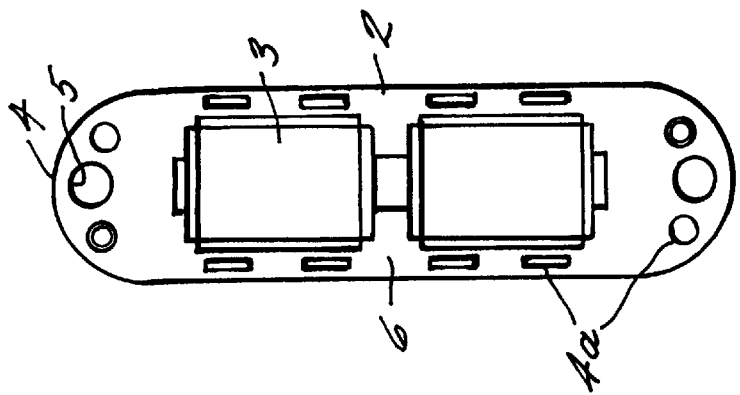
FIG. 1C is a rear view of the conventional adapter.
Figure 1A:
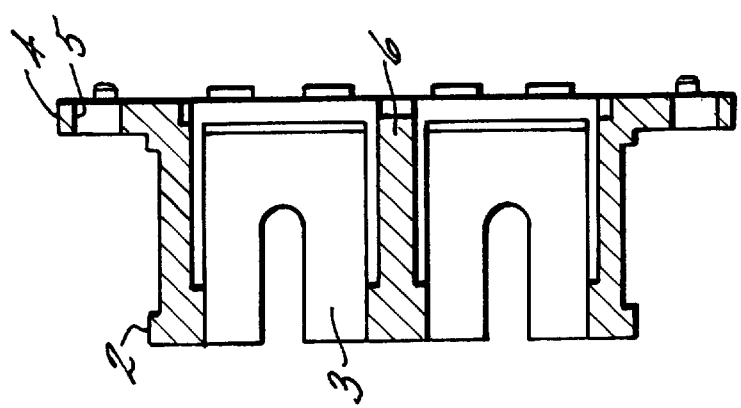
FIG. 1A is a side cross-sectional view of a conventional adapter.
Figure 1B:
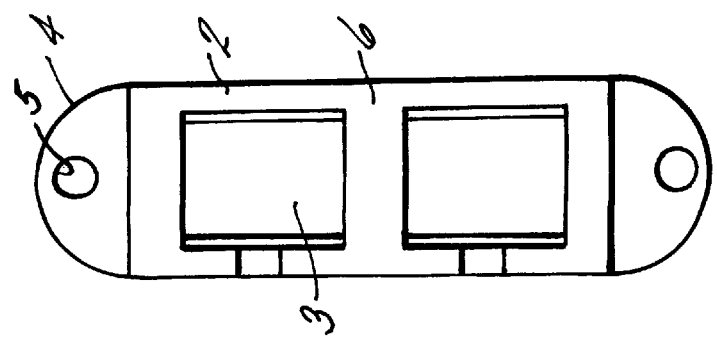
FIG. 1B is a front view of the conventional adapter.

FIG. 3 is a side view of an adapter, shown generally at 20, for mounting in a standard panel cut-out. The adapter includes four first interface ports 22. In the embodiment shown in FIG. 3, the first interface is ST. The adapter includes two adapter bodies 20' and 20". Adapter body 20" includes two ST ports 22 connected to a flange 24. Adapter body 20' includes two ST ports 22 connected to a block 28 which is connected to a flange 26. The block 28 includes a groove 30 for receiving a metallic mounting clip as described above. The two adapter bodies 20' and 20" are ultrasonically welded together to form the adapter 20 (an alignment sleeve is assembled within the two bodies prior to the welding process). The block 28 is rectangular and is dimensioned to fit a panel cut-out for a second interface adapter. In the embodiment shown in FIG. 3, the second interface is SC. The rectangular block 28 enables the ST-ST adapter 20 to fit into the same panel cut-out as an SC adapter. Thus, a manufacturer can produce panels with the same cut-out opening and still accommodate mounting of both SC or ST adapters.

FIG. 5 is a perspective view of a variation of the adapter shown in FIGS. 3 and 4. The groove 30 for accepting the conventional metallic mounting clip is replaced by integral mounting clips shown generally at 40. A mounting clip 40 is formed at one or both ends of the block 28 and is integral with block 28. The mounting clip 40 includes two resilient sections 42 and 42' that are angled away from the surface of the adapter body as shown in FIG. 6. A first end of each resilient section 42 and 42' is integral with the adapter body. The second end of each resilient section 42 and 42' includes a retention section 44 and 44'. The retention sections 44 and 44' are substantially parallel to the surface of the adapter body. The mounting clips 40 are preferably molded polymer clips that are resilient. When the adapter is inserted into a panel cut-out, the resilient sections 42 and 42' deflect toward the block 28 and then return to their original position after the retention sections 44 and 44' clear the panel's thickness to retain the adapter within the panel. As shown in FIG. 7, the mounting clips may also be molded into the SC type adapter body to eliminate the need for the metallic clips. Of course, any other type of adapter can be molded to include the integral mounting clips to eliminate the need for separate mounting clips.

Figure 2C:
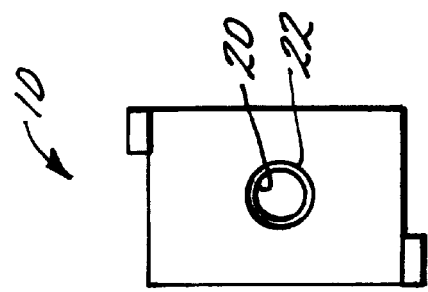
FIG. 2C is a rear view of the conventional retention latch.
Figure 2A:
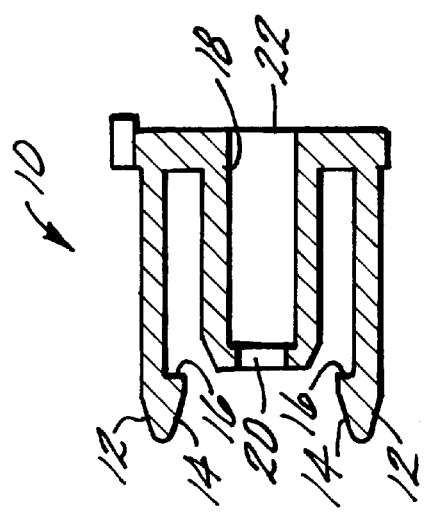
FIG. 2A is a side cross-sectional view of a conventional retention latch.
Figure 2B:
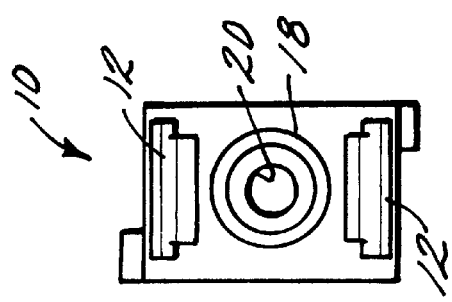
FIG. 2B is a front view of the conventional retention latch.
Figure 8:
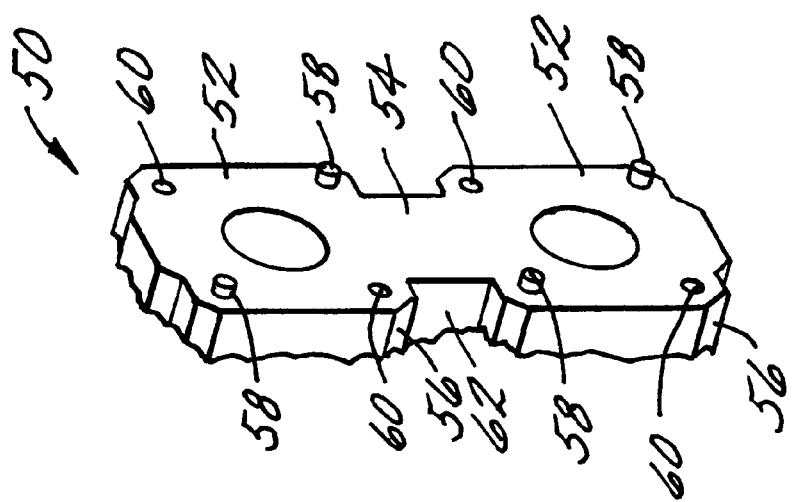
FIG. 8 is a perspective view of a duplex retention latch.

FIG. 8 is a perspective view of a portion of a duplex retention latch shown generally at 50. The duplex retention latch 50 includes two simplex retention latches 52 joined by a connecting member 54. The simplex retention latches 52 operate in the same manner as the conventional retention latch 10 shown in FIGS. 2A–2C. The width of the connecting member 54 may be less than the width of the retention latches 52 to form a channel 62 in the side of each duplex retention latch 50. Each retention latch 52 is generally rectangular and may have a bevel 56 formed at each corner. The portion of the mold for the duplex retention latch 50 corresponding to the connecting member 54 may be blocked so as to create two simplex retention latches 52.

The surface of each retention latch 52 includes posts 58 and holes 60. The posts 58 and holes 60 provide for aligning the duplex retention latches. If the mold for the duplex retention latch is modified to eliminate the connecting member 54, the posts 58 and the holes 60 provide for aligning the simplex retention latches. The posts 58 are formed at the upper left and lower right regions of each retention latch. The holes 60 are formed at the upper right and lower left regions of each retention latch. This arrangement allows for mating of duplex-to-duplex or simplex-to-simplex retention latches when the retention latches are in multiple orientations. Of course, other post and hole configurations may be used to align the duplex or simplex retention latches.

Figure 9:
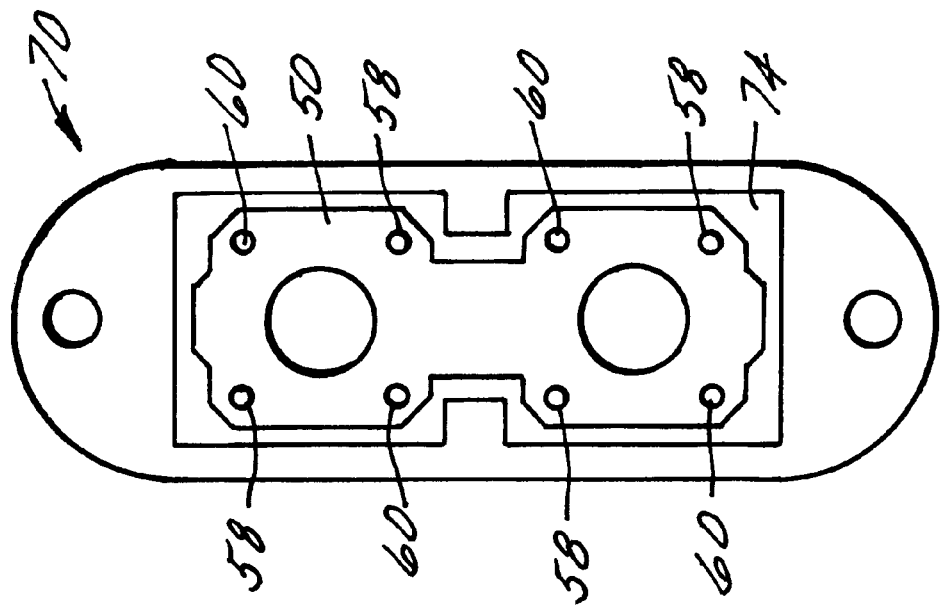
FIG. 9 is a front view of the duplex retention latch in an adapter body.

FIG. 9 is a back view of the duplex retention latch 50 placed within a duplex adapter body shown generally at 70. The duplex adapter body has an opening 74 for receiving the duplex retention latch 50. The opening 74 includes two protrusions 72 that extend into the opening 74 and are placed within the channel 62 formed in the duplex retention latch 50. Alternatively, the adapter body 70 can receive two simplex retention latches in the opening 74.

Figure 10:
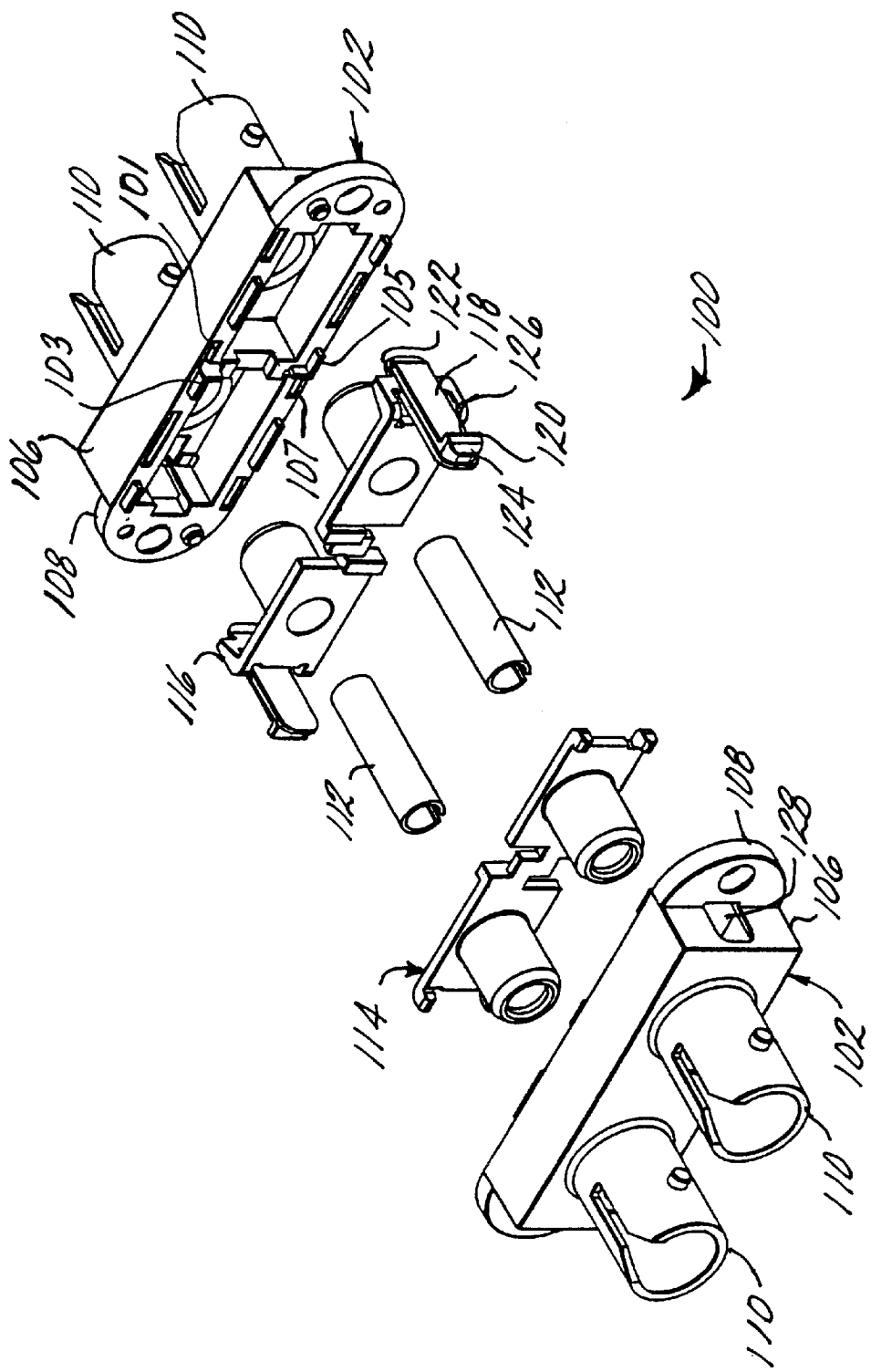
FIG. 10 is an exploded perspective view of an alternative adapter.

FIG. 10 is a perspective view of an alternative embodiment of the adapter. The adapter is shown generally at 100 and is made up of two adapter bodies 102 which are identical. The embodiment shown in FIG. 10 couples optical fibers that are fitted with a first interface connector to optical fibers fitted with a first interface connector. In the embodiment shown in FIG. 10, the first interface is ST and thus each adapter body includes first interface ports 110. Each adapter body includes a block 106 that has an outer dimension to fit within a second interface panel cut-out (e.g. SC). In the embodiment shown in FIG. 10, each adapter body includes a flange 108, but it is understood that the adapter bodies may be flangeless.

The adapter 100 also includes sleeves 112 that receive a connector ferrule in each end and align the ferrules. The sleeves 112 are placed in sleeve retainers 114 and 116. Sleeve retainer 114 is a first interface sleeve retainer without mounting clips and sleeve retainer 116 is a first interface sleeve retainer with mounting clips 118. The mounting clips 118 are integral with the sleeve retainer 116. One end of the mounting clip 118 includes a projection 120 that extends away from the mounting clip body. The projection 120 has a tapered surface 124 and a planar surface 126. In an alternative embodiment, the surface 124 has a rounded, arcuate shape. The sleeve retainer 116 and the mounting clip 118 are made from a resilient material (e.g. plastic) and thus the mounting clip 118 can be flexed and then return to its original position. Openings 128 are provided in each adapter body 102 for receiving the mounting clip 118. The mounting clip 118 is sized so that it is positioned in all openings 128 formed in the adapter bodies when the adapter 100 is assembled.

Figure 11:
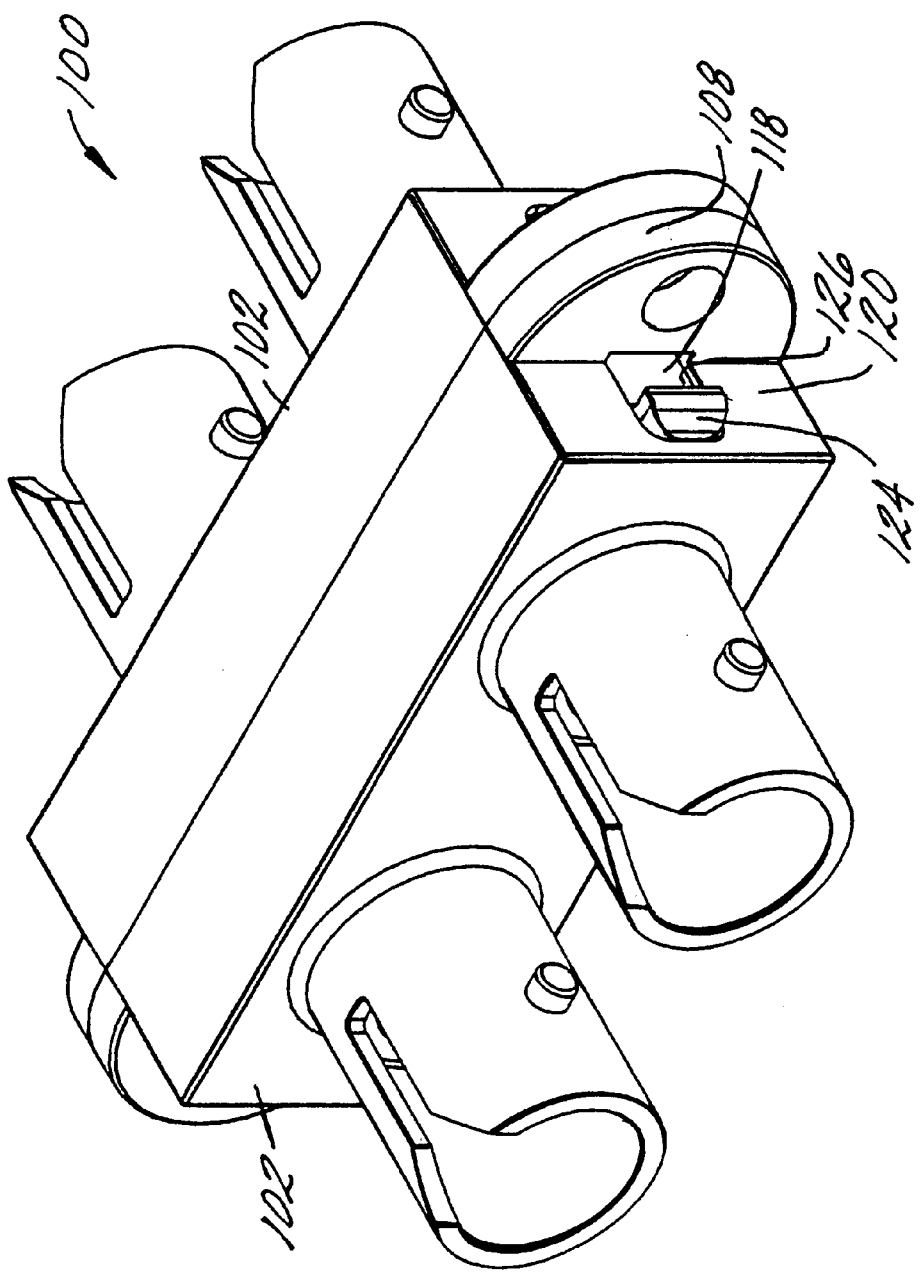
FIG. 11 is a perspective view of the adapter of FIG. 10.

FIG. 11 is a perspective view of the assembled adapter 100. The adapter 100 is assembled by ultrasonically welding the adapter bodies 102 together. Energy directors are provided on each adapter body 102 and are described below in detail. As shown in FIG. 11, the mounting clip 118 is positioned in openings 128 in both of the adapter bodies. This feature is more clearly shown in FIG. 15. The lip 122 formed on the mounting clip 118 seals the openings 128 and prevents contaminants (e.g. dust) from entering the adapter 100. When the adapter 100 is mounted to a panel, the tapered surface 124 of the projection 120 contacts the edge of the panel cut-out. As the adapter 100 is pushed towards the panel, the mounting clip 118 is deflected towards the interior of the adapter 100. When the tapered surface 124 clears the edge of the panel, the mounting clip returns to its rest position. The interference between the projection 120 and the flange 108 prevents movement of the adapter 100 in or out of the panel. The flange 108 is positioned on the back side of the panel thus providing an aesthetically pleasing installation. To release the adapter 100, the user pushes the projections 120 towards adapter 100 so the projections 120 clear the panel edge.

By providing the mounting clips 118 on the retainer sleeves, the length of the mounting clip is longer as compared to the embodiment shown in FIG. 6. This enables improved control of the force needed to insert the adapter into a panel cut-out (when mounting clips are assembled into adapter) due to the additional length of the mounting clip. When the mounting clips are formed on the body as shown in FIG. 6, the length of the mounting clip is significantly shorter which results in a higher adapter insertion force.

Figure 12:
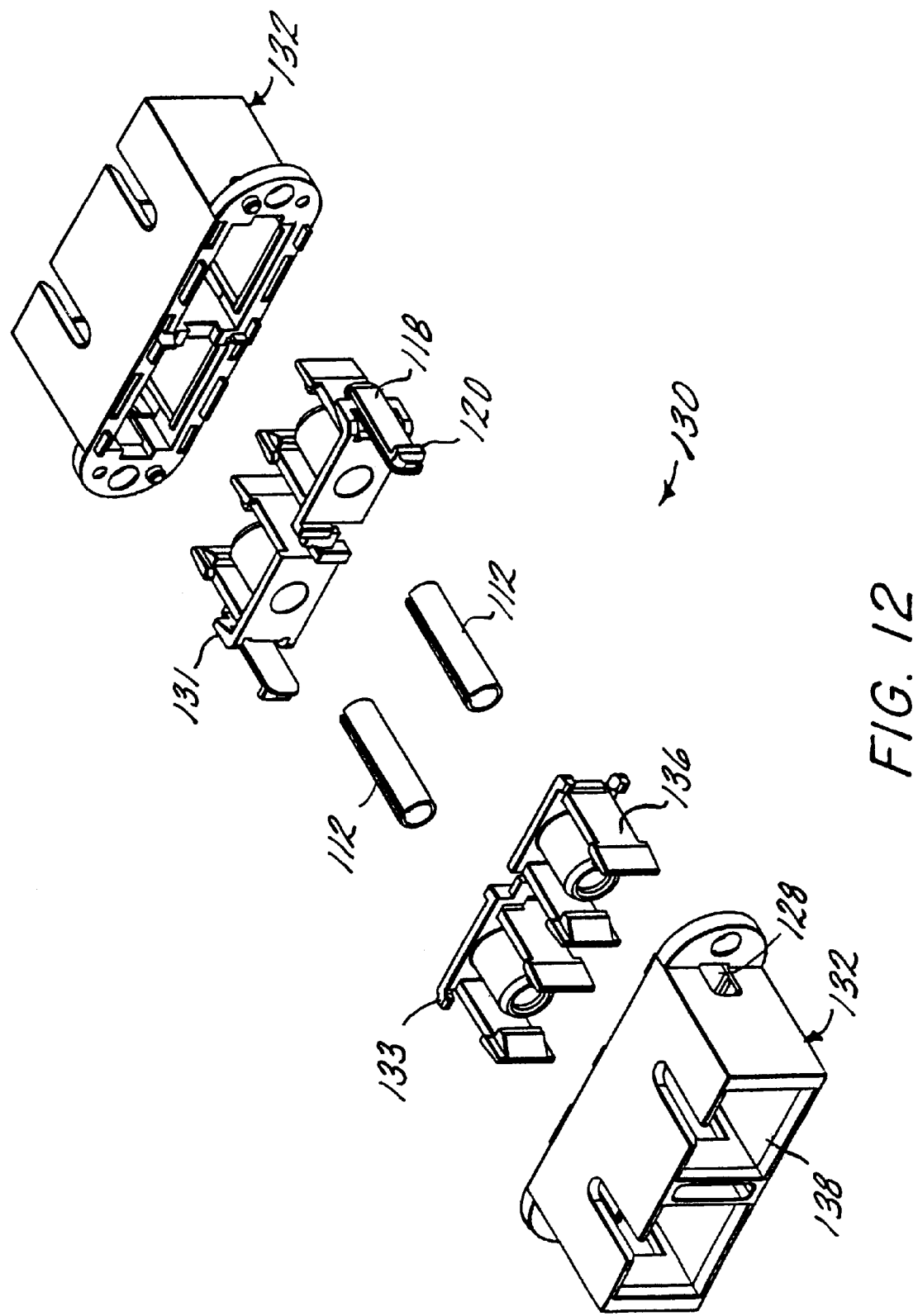
FIG. 12 is an exploded perspective view of an alternative adapter.

FIG. 12 is an exploded perspective view of an adapter 130 for coupling optical fiber fitted with a second interface connector. In the embodiment shown in FIG. 12, the second interface is SC. The adapter 130 includes two adapter bodies 132 which are identical. Sleeves 112 are provided for aligning the connector ferrules when inserted into each of the sleeves 112. Two sleeve retainers 131 and 133 are also used. Sleeve retainer 131 is a second interface sleeve retainer with mounting clips. Sleeve retainer 133 is a second interface sleeve retainer without mounting clips. Both sleeve retainers 131 and 133 include fingers 136 that grip the second interface connectors. Similarly, each adapter body 132 includes second interface ports 138 for receiving a second interface connector. The mounting clips 118 are similar to those described above with reference to FIGS. 10 and 11.

Figure 13:
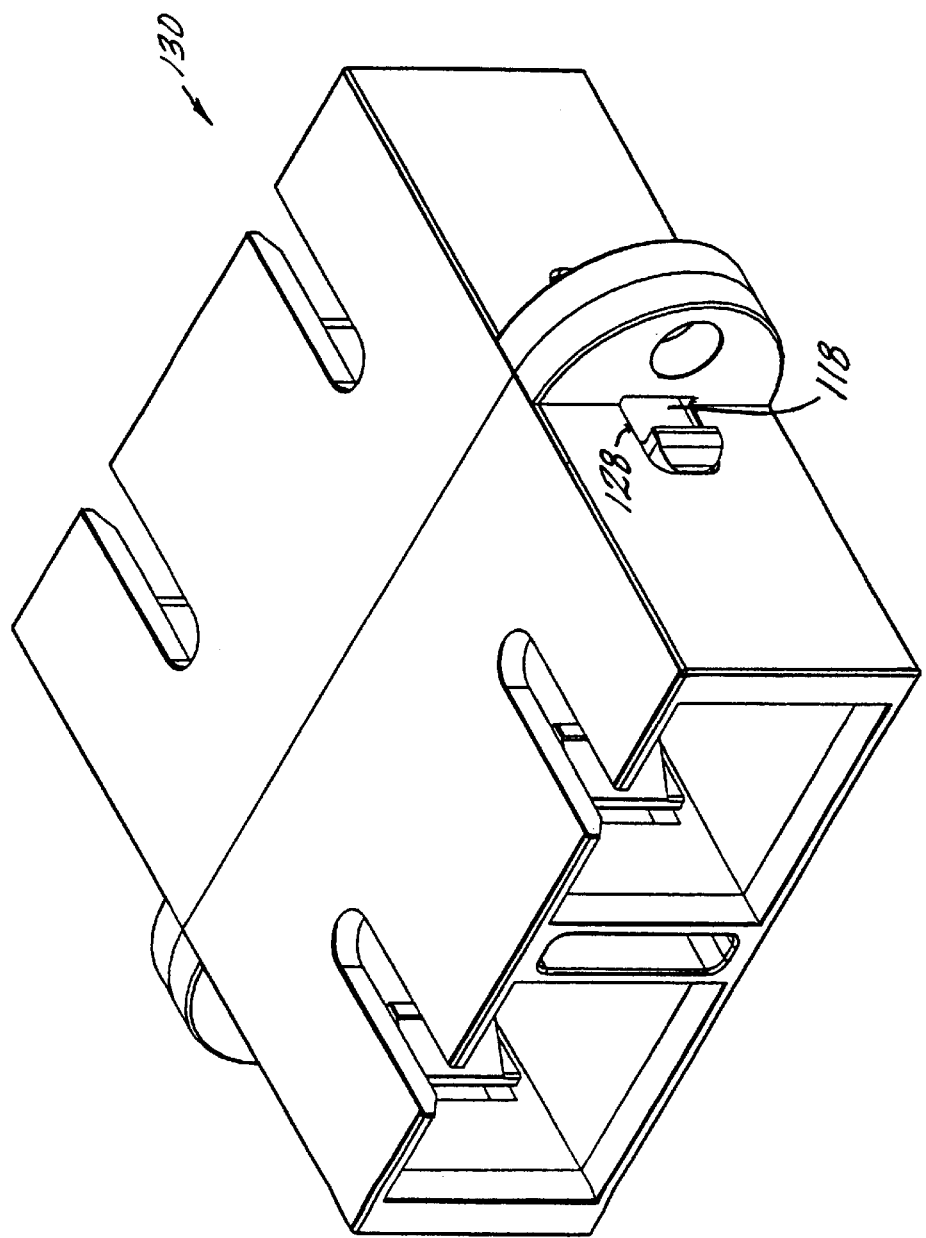
FIG. 13 is a perspective view of the adapter of FIG. 12.

FIG. 13 is a perspective view of the adapter shown in FIG. 12 assembled. As previously described, mounting clips 118 are positioned in each opening 128. The lip 122 formed on each mounting clip 118 prevents contaminants from entering the adapter 130. The adapter 130 is mounted in a panel cut-out in the same manner as described above with reference to FIG. 11.

Figure 14:
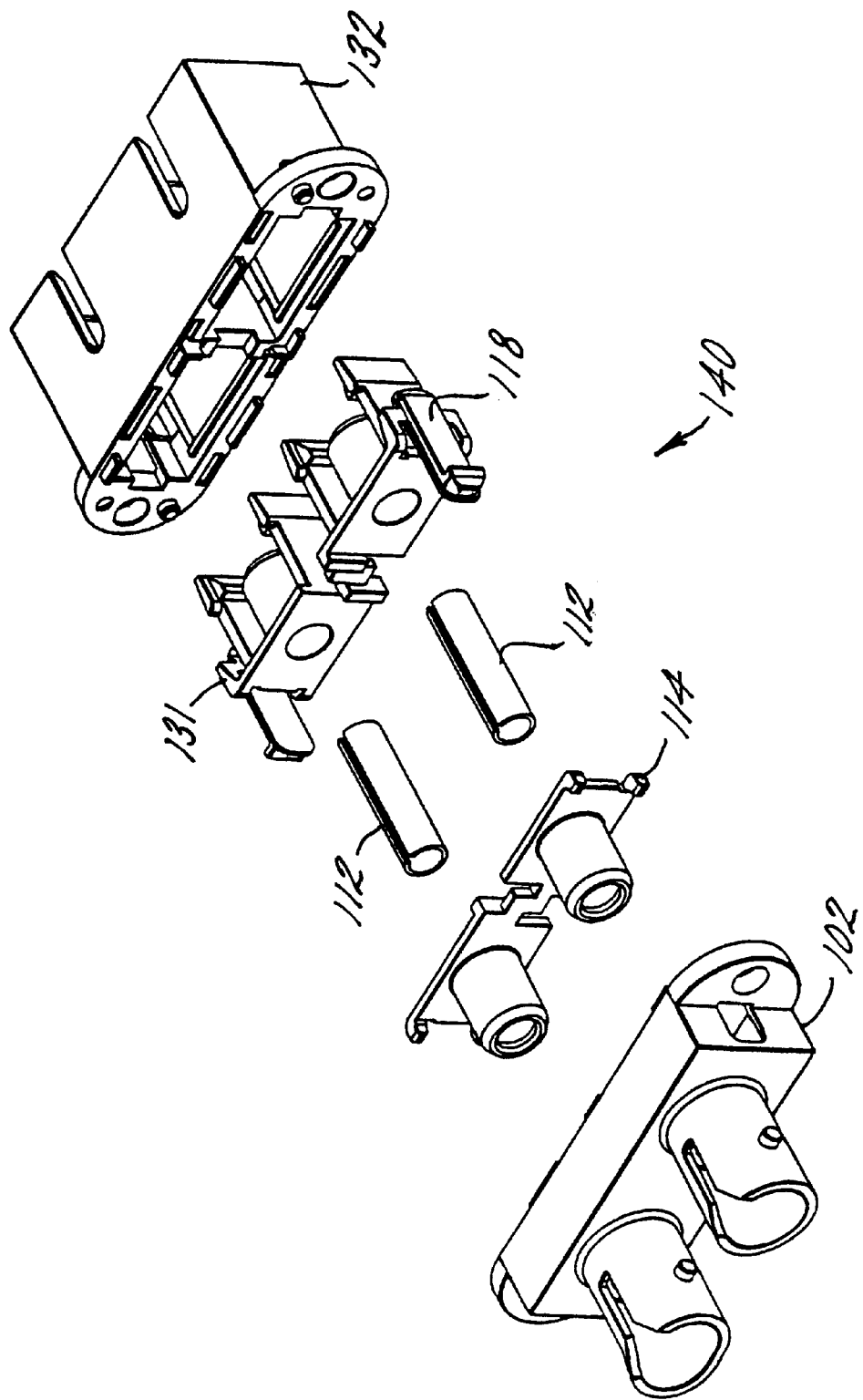
FIG. 14 is an exploded perspective view of an alternative adapter.
Figure 15:
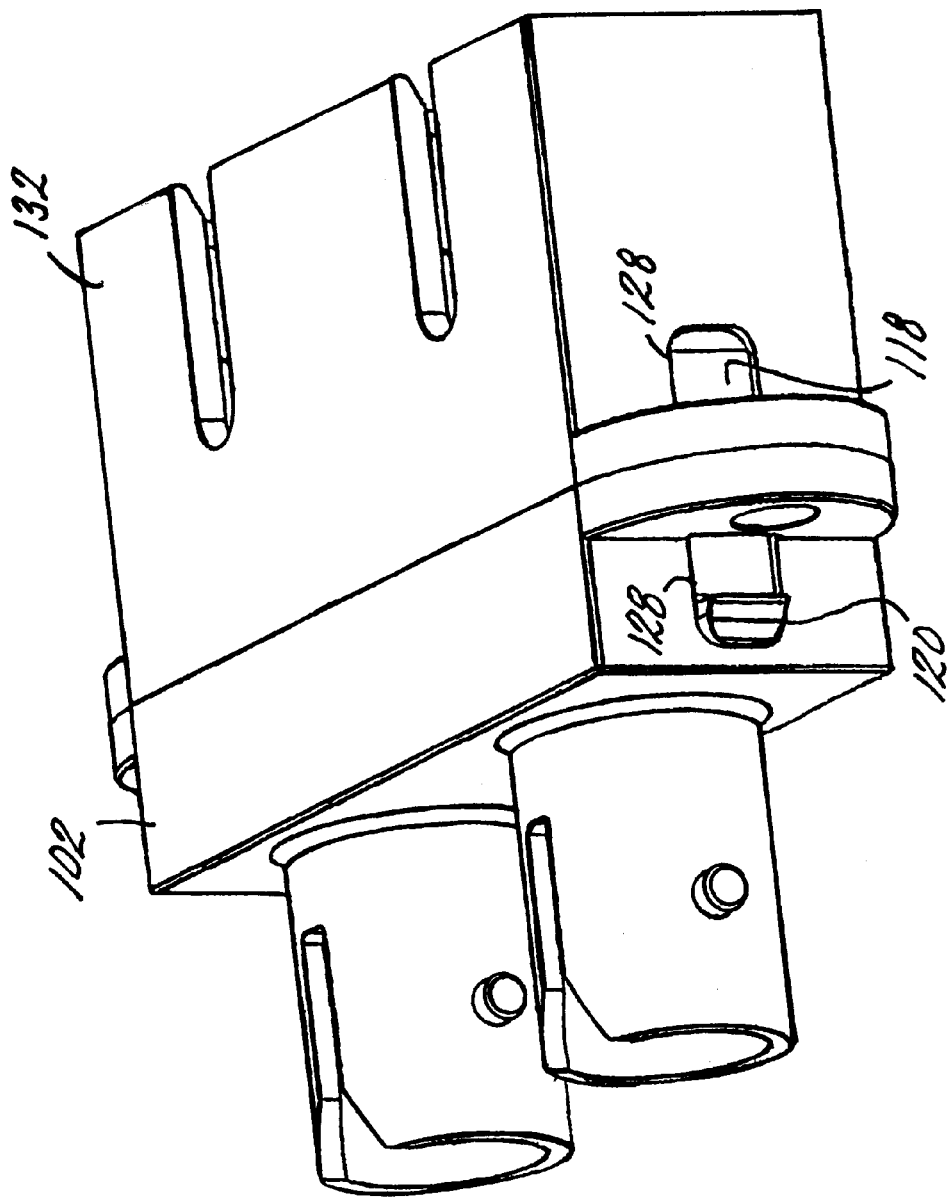
FIG. 15 is a perspective view of the adapter of FIG. 14.

FIG. 14 is an exploded view of an adapter 140 for coupling optical fiber fitted with a first interface connector to optical fiber fitted with a second interface connector. The adapter 140 is made up of components previously described with reference to FIGS. 10–13. Mounting clips 118 are provided on second interface sleeve retainer 131. FIG. 15 is a perspective view of the adapter 140 assembled. Because the mounting clips 118 are positioned on the second interface sleeve retainer 131, the first interface adapter body 102 will extend through the panel cut-out.

Figure 16:
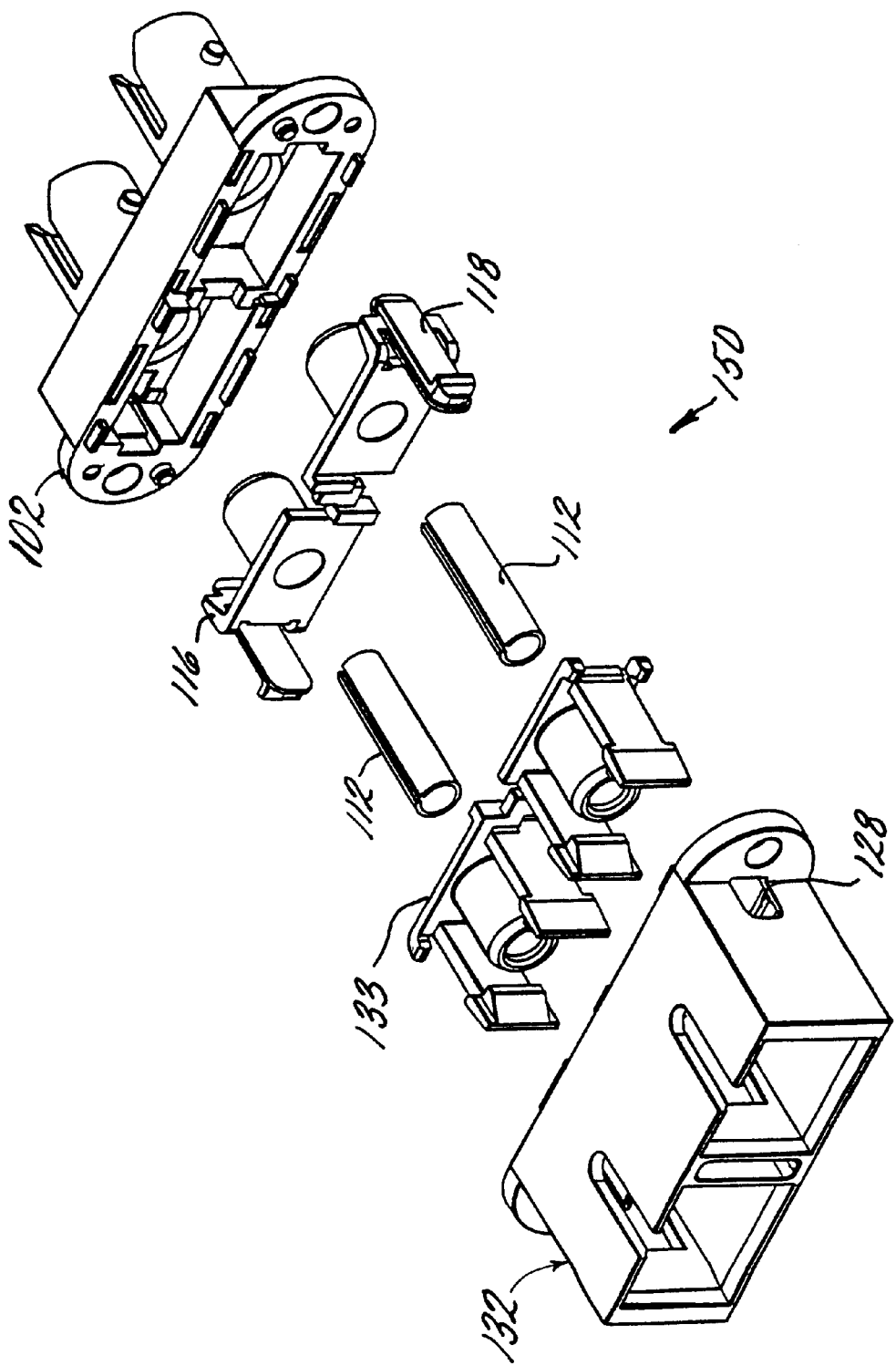
FIG. 16 is an exploded perspective view of an alternative adapter.
Figure 17:
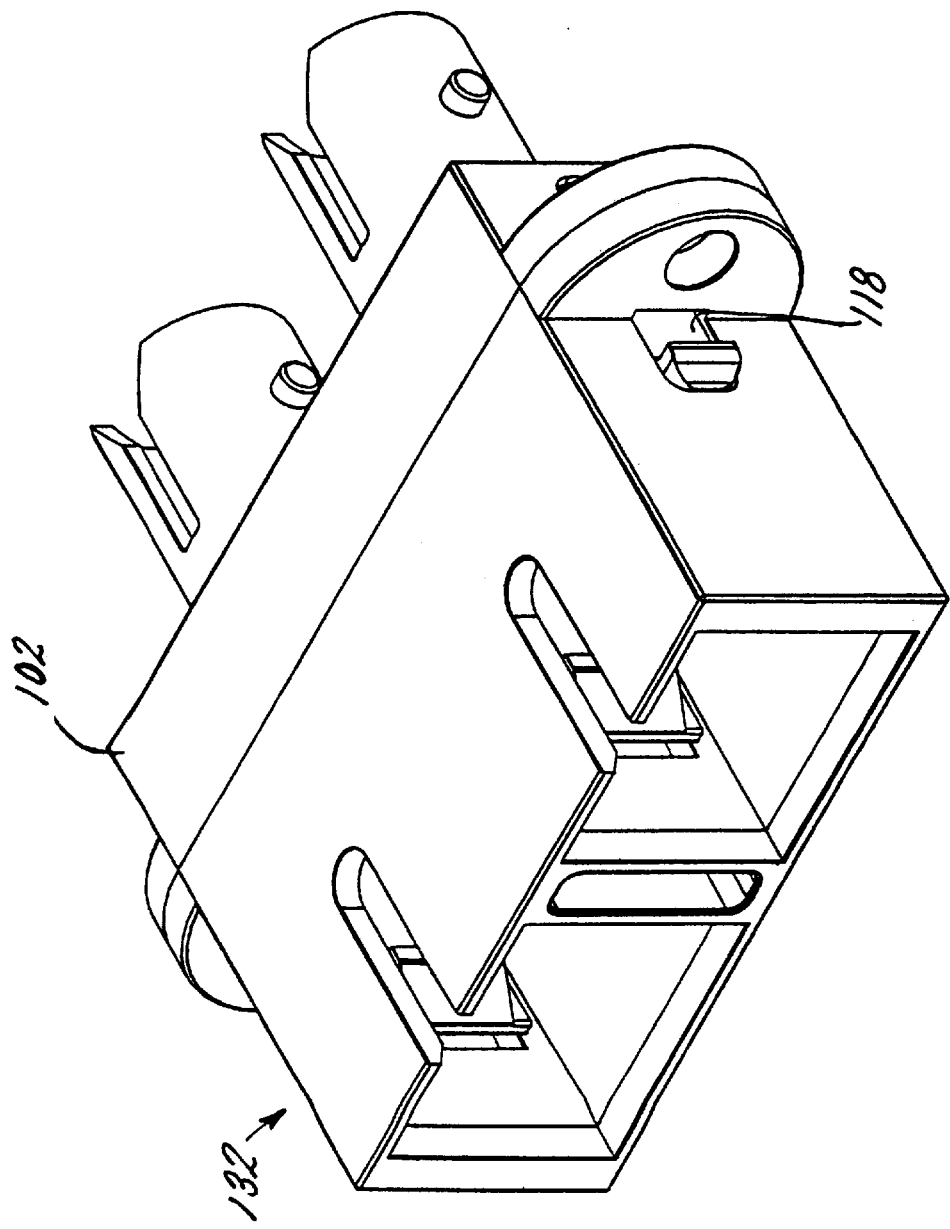
FIG. 17 is a perspective view of the adapter of FIG. 16.

FIG. 16 is an exploded view of an adapter 150 for coupling optical fiber fitted with a second interface connector to optical fiber fitted with a first interface connector. The adapter 140 is made up of components previously described with reference to FIGS. 10–13. Mounting clips 118 are provided on the first interface sleeve retainer 116. FIG. 17 is a perspective view of the adapter 150 assembled. Because the mounting clips 118 are positioned on the first interface sleeve retainer 116, the second interface adapter body 132 will extend through the panel cut-out.

As can be seen from FIGS. 10–17, an important aspect of the invention is that all four combinations of adapters (first interface-first interface, second interface-second interface, first interface-second interface, second interface-first interface) can be assembled using a plurality of common parts. The invention uses one first interface (ST) adapter body, one second interface (SC) adapter body, and four sleeve retainers to provide all the configurations described above. This reduces the manufacturing costs and reduces the variety of parts that need to be stocked by the manufacturer. In addition, all four configurations allow the flange 108 to be positioned on the back side of the panel thus providing an aesthetically pleasing installation.

Figure 18:
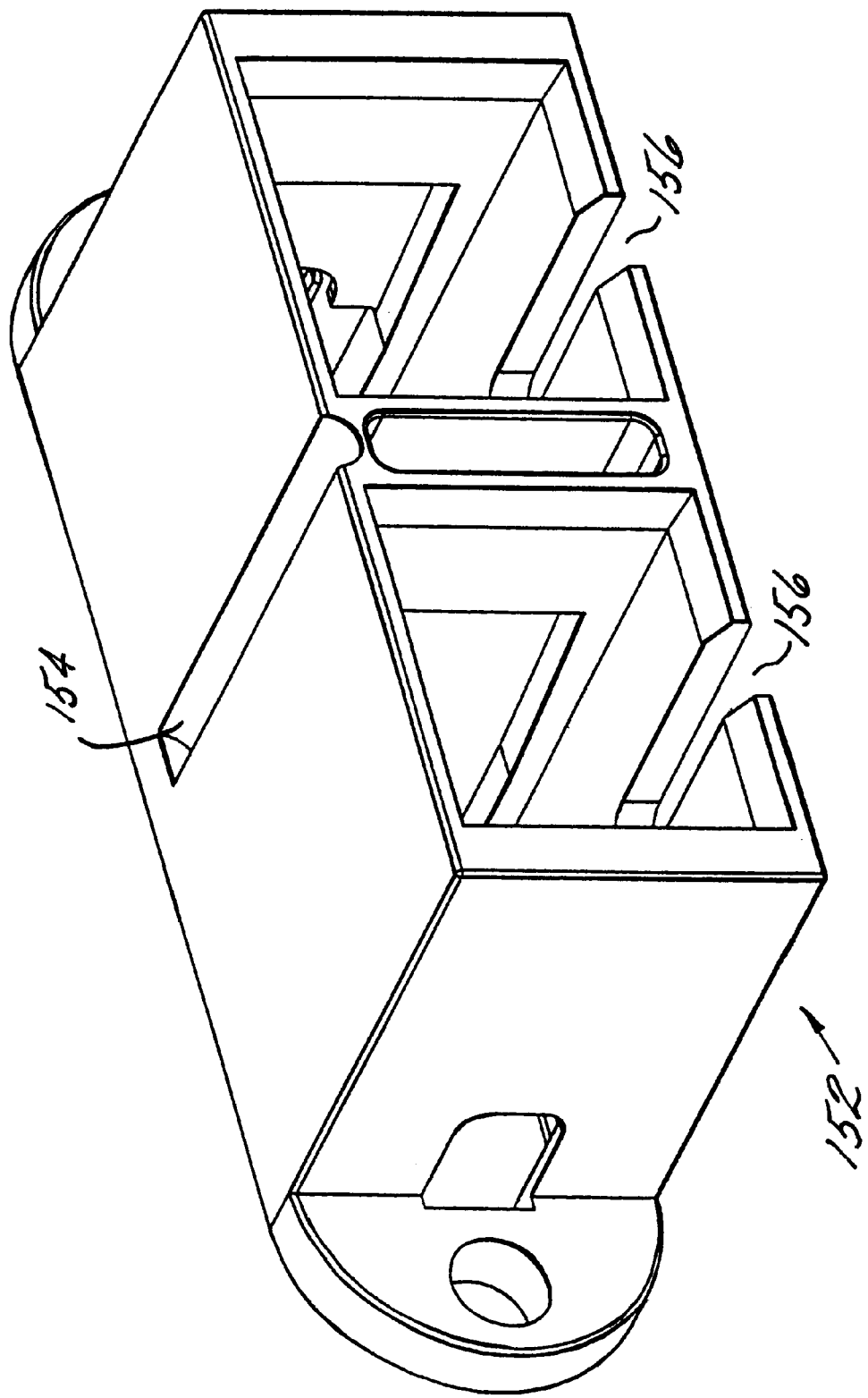
FIG. 18 is a perspective view of an adapter body including a keying groove.

FIG. 18 is a perspective view of an alternative second interface adapter body 152. Fiber optic adapters all have one or two keyways that enable consistent orientation relative to the mating connector (plug) via a key on the connector which engages the adapter keyway. When these adapters are mounted to a panel, it is desirable for these keyways to be oriented consistently in the same direction and for that orientation to be in a direction such that the keyways are facing the person who is mating a connector to the adapters (who, therefore, has to align the connector so that the keys engage the keyways). The manufacturer's assembly personnel are directed to orient the adapter keyways in a certain direction (based on the position that the adapters will be facing when the connector-holder will be mating to them). This is a visual orientation which can, therefore, be inadvertently assembled in the wrong direction.

To prevent misassembly, adapter body 152 includes a groove 154 formed in the exterior surface thereof for receiving a corresponding projection formed in the panel cut-out. This ensures that the adapter 152 is positioned in the panel cut-out in the proper orientation. Typically, the proper orientation of the adapter 152 is such that the keyways 156 formed in each port of the second interface adapter body 152 are visible. As a result, the adapter can only be inserted into that panel cut-out in the one orientation. Of course, adapter 152 can be installed into a panel that does not include a projection.

Figure 19:
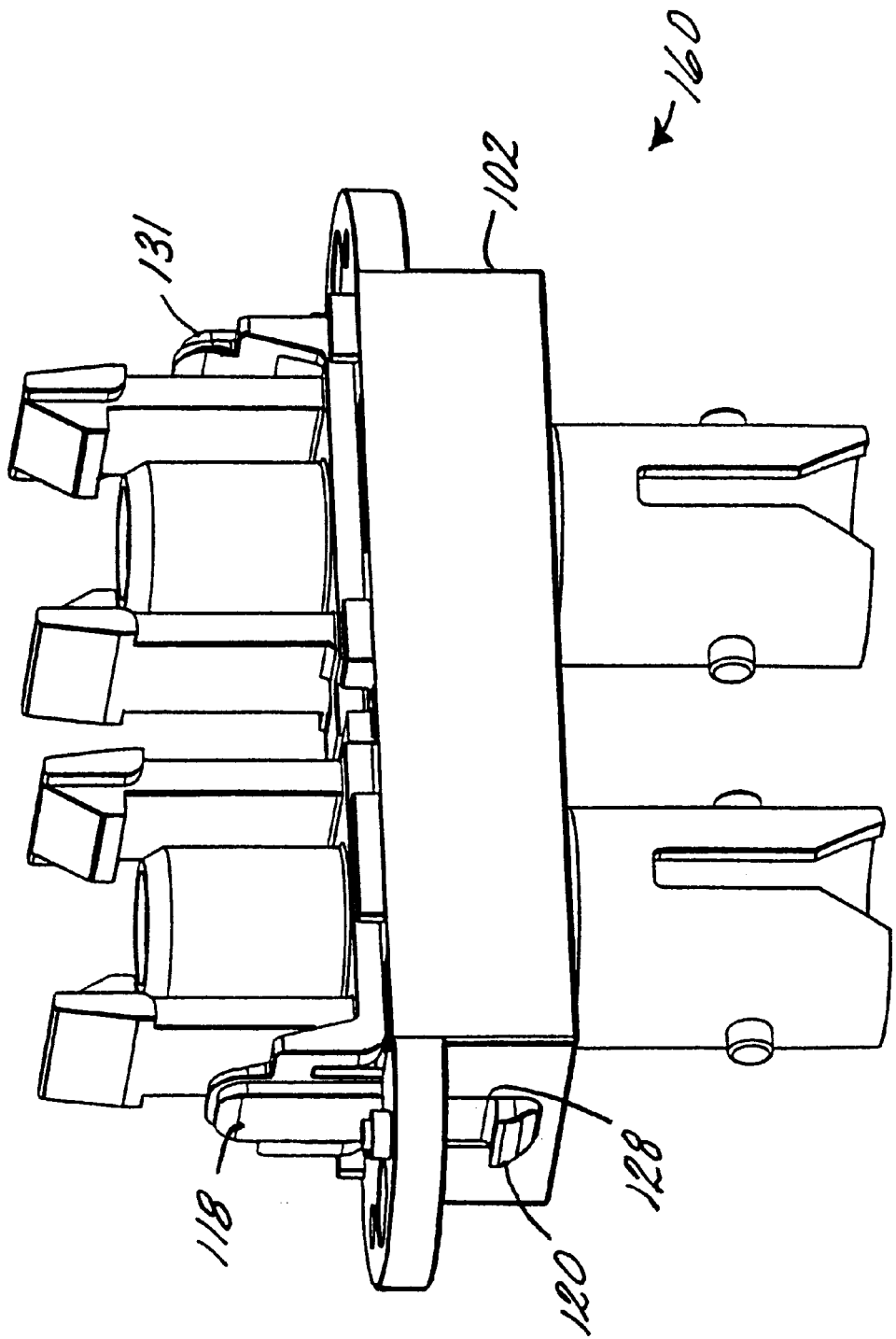
FIG. 19 is a perspective view of a partially assembled adapter.
Figure 21:
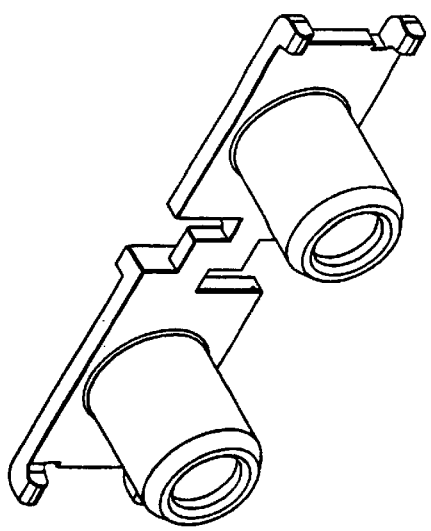
FIG. 21 is a perspective view of an ST sleeve retainer without mounting clips.

FIG. 19 is a perspective view of a partial adapter assembly 160 and illustrates another important feature of the present invention. In manufacturing the adapters, the adapters are often assembled at one station and then transported to another station where the adapter bodies are ultrasonically welded together. In the prior art, transporting the partially assembled adapter was troublesome because the components could come apart or become misaligned during transport. As shown in FIG. 19, the second interface sleeve retainer with mounting clips 131 holds the partial adapter assembly 160 together because the projection 120 of the mounting clip 118 is positioned in the openings 128 of the first interface adapter body 102. This prevents the components of the partial adapter assembly from shifting or coming apart during transport to a welding area. Accordingly, less care is necessary during transport and manufacturing is facilitated. It is also possible to inventory this sub-assembly, the advantage being its advanced assembly stage. Although FIG. 19 shows a first interface-second interface adapter sub-assembly, it is understood that all the adapters include this advantage by virtue of the use of mounting clips integral with the sleeve retainers.

Figure 23:
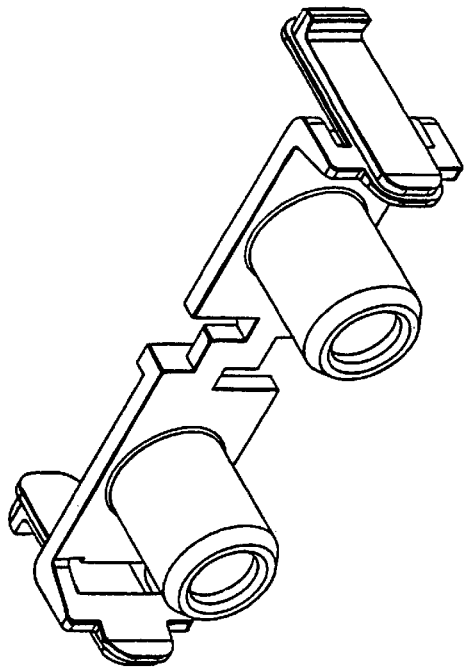
FIG. 23 is a perspective view of an ST sleeve retainer with mounting clips.
Figure 20:
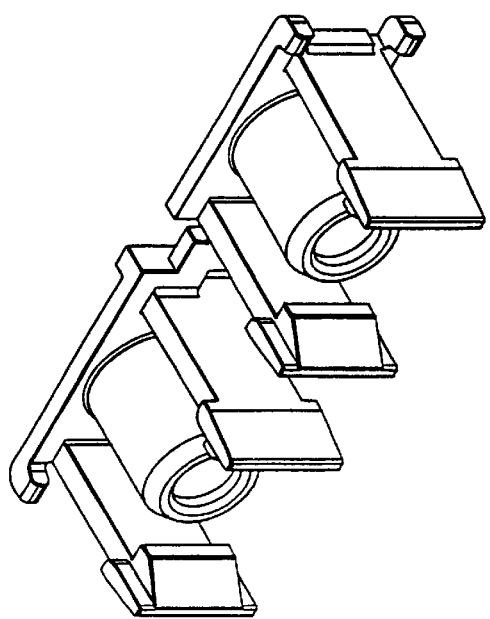
FIG. 20 is a perspective view of an SC sleeve retainer without mounting clips.
Figure 22:
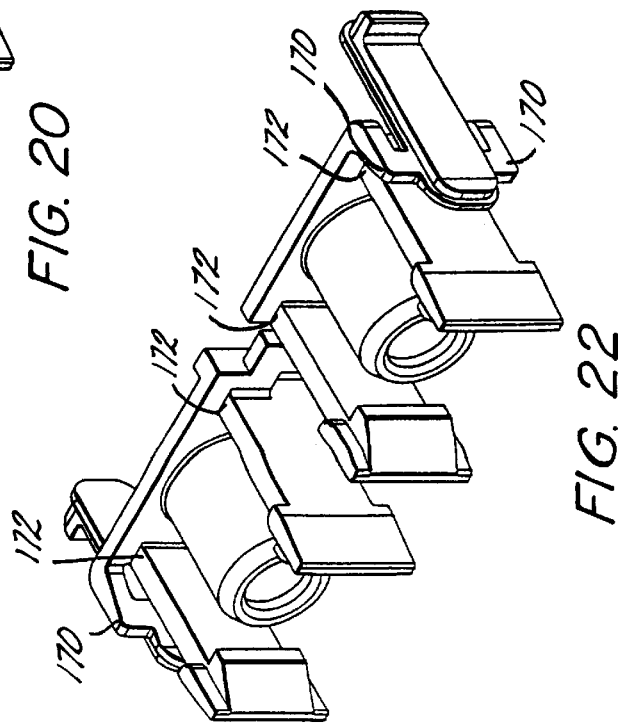
FIG. 22 is a perspective view of an SC sleeve retainer with mounting clips.

FIGS. 20–23 illustrate yet another important aspect of the invention. To produce all the adapter configurations of the present invention, four different sleeve retainers are needed. The various sleeve retainers are second interface without mounting clips (FIG. 20), first interface without mounting clips (FIG. 21), second interface with mounting clips (FIG. 22) and first interface with mounting clips (FIG. 23). All of these sleeve retainers are made from the same mold by using inserts in the mold. The mold, without any inserts, produces the second interface sleeve retainer with mounting clips shown in FIG. 22. If the mold is blocked with inserts at locations 170, the result is the second interface retainer sleeve without mounting clips as shown in FIG. 20. If the mold is blocked at locations 172, the result is the first interface sleeve retainer with mounting clips shown in FIG. 23. If the mold is blocked at both locations 170 and locations 172, the result is first interface sleeve retainer without mounting clips shown in FIG. 21. Since only a single mold is necessary, manufacturing is facilitated.

Referring again to FIG. 10, each adapter body 102 includes energy directors 103 and 105 and openings 101 and 107 for receiving the energy directors on the mating adapter body. "Energy director" is a term used to describe a raised section of a polymer component which fits into a correspondingly-shaped depression within the mating component which serves to retain the two components together after being subjected to an ultrasonic welding operation. Conventional energy directors are shaped as a straight, thin "wall" or a cylindrical post. A shortcoming of such traditional shapes is the strength of the ultrasonic bond and its resistance to the two components being pulled, pushed, or twisted apart.

Each energy director 103 and 105 are made from a first raised portion on the surface of the adapter body and a second raised portion on the adapter body substantially perpendicular to the first raised portion. The first and second raised portions contact each other. In the exemplary embodiment shown in FIG. 10, energy directors 103 and 105 have an L-shape which results in additional strength for the weld in that there is increased surface area as well as increased resistance from forces exerted in a plane that is perpendicular to the vertical leg of the L which is the direction from which the forces are most apt to come in actual adapter usage. The conventional adapter being produced today exhibits poor resistance to forces from that direction. Although the energy directors are shown as L-shaped, it is understood that different alignments are permissible including T-shaped and X-shaped.

The use of L-shaped energy directors provide additional benefits. When the adapter bodies are welded together, the L-shaped energy directors formed on each adapter body half combine to form an I structure within the assembled adapter. This increases the strength of the adapter similar to an I-beam.

Figure 24:
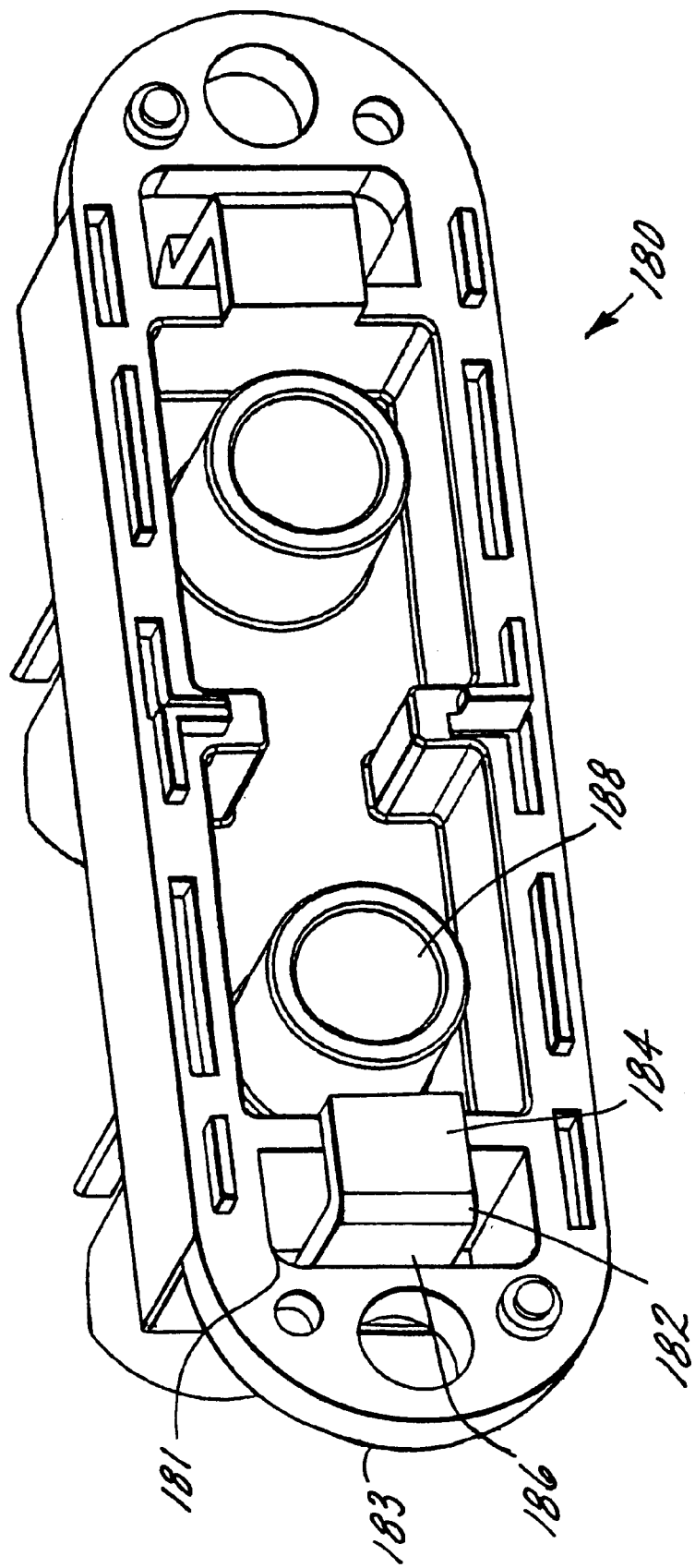
FIG. 24 is a perspective view of an adapter body having integral mounting clips.
Figure 25:
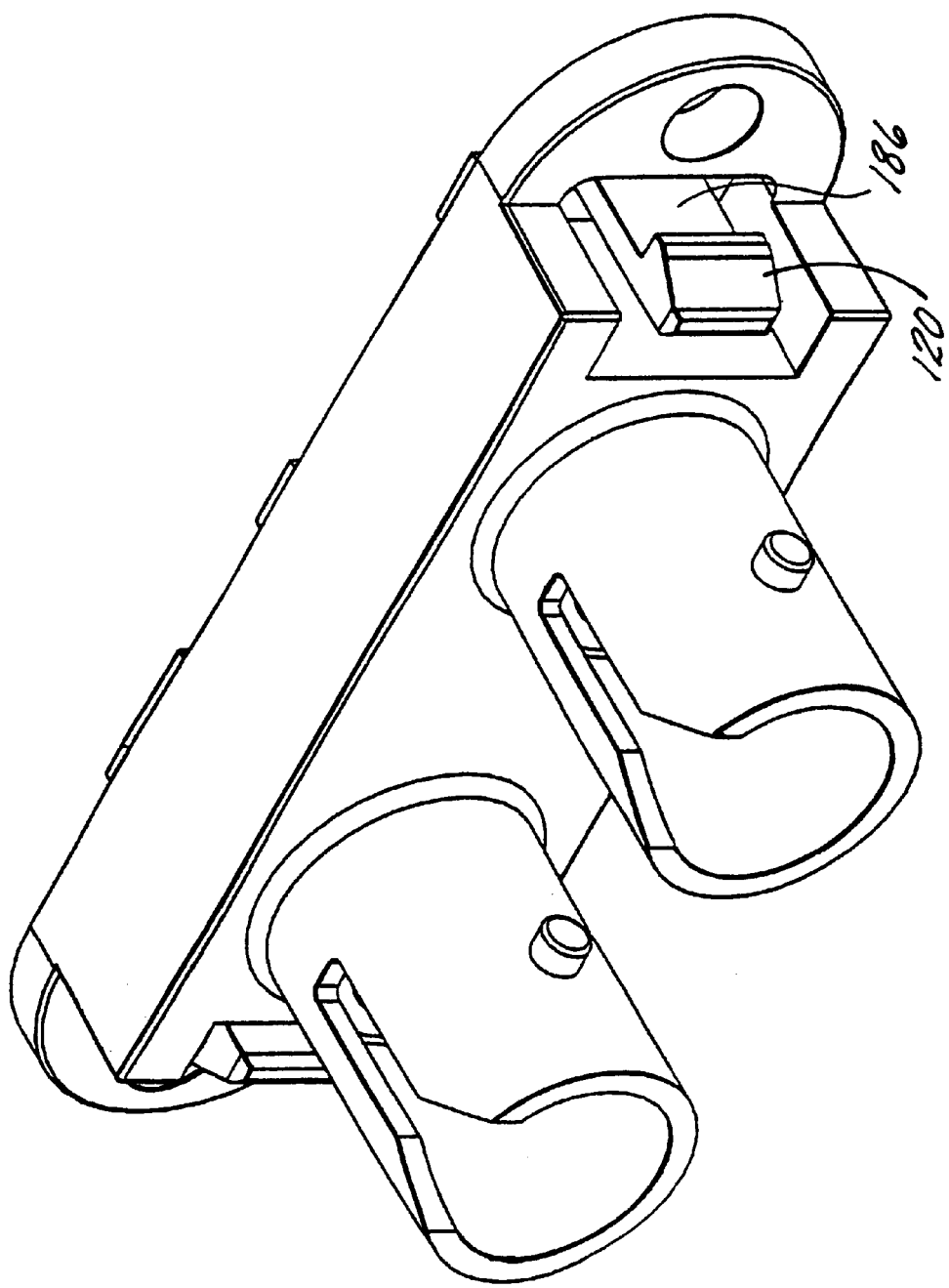
FIG. 25 is an alternative perspective view of the adapter body shown in FIG. 24.

FIG. 24 is a perspective view of an alternative embodiment of the present invention. As shown in FIG. 24, the mounting clips 182 are integral with the adapter body 180. The mounting clip 182 includes a first portion 184 integral with the adapter body 182 and perpendicular to the central axis of the ports 188. A second portion 186 extends through an opening 181 formed in the flange 183 of the adapter body 180. The second portion is substantially perpendicular to the first portion 184. As shown in FIG. 25, the second portion 186 includes a projection 120 described above with reference to FIG. 10. The mounting clip 182 is made from a resilient material and is able to flex towards the adapter body and return to its original position upon passing through a panel cut-out.

FIG. 26 is a perspective view of yet another embodiment of the adapter. Adapter 190 differs from the previous embodiments in that the mounting clips 192 are separate components and are not integral with either the sleeve retainer or the adapter body. The mounting clips 192 are positioned in openings formed in the adapter bodies. One end of the mounting clip 192 includes a projection 120 which has been described above. Although an ST-SC configuration is shown, the separate mounting clips 192 may be used with any of the above described configurations. The mounting clips 129 may be attached to the adapter body in a variety of ways. First, the non-flexing end away form projection 120 may be press fit into the adapter body. Alternatively, the mounting clips 129 may be molded together with a retainer ring and held in place between the flanges of both bodies after welding. Another alternative is to mechanically latch or use an adhesive to connect the mounting clip 129 to the adapter body.

Although the invention has been shown as including duplex adapter bodies and duplex retainer sleeves, it is understood that the benefits of the invention are achieved using simplex adapter bodies and simplex retainer sleeves. That is, the mounting clips may be integral with a simplex sleeve retainer, a simplex adapter body or be separate components in a simplex adapter. Accordingly, the invention should not be considered limited to duplex embodiments.

The adapters of the present invention provide numerous advantages over the prior art. A block that fits a second interface panel cut-out is used to mount an adapter having a first interface port in a common panel. The adapter may include integral mounting clips to eliminate a separate mounting clip used in the prior art. A duplex retention latch reduces the number of parts needed to assemble the adapter and also reduces the time required for assembly. In an alternative embodiment, the mounting clip extends through an opening in the body of the adapter and may be integral with a sleeve retainer, integral with an adapter body or separate components.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An adapter for coupling optical fiber comprising:
    a first adapter body including a port for receiving an optical fiber;
    a second adapter body connected to said first adapter body, the second adapter body including:
        a block having an outer dimension corresponding to a panel cut-out for an interface adapter; and a first interface port, for receiving a second optical fiber fitted with an interface connector, mounted to said block, wherein said interface adapter is SC.

2. The adapter of claim 1 further comprising a groove formed in said block for receiving a mounting clip.

3. The adapter of claim 1 further comprising a mounting clip integral with said block.

4. The adapter of claim 3 wherein said mounting clip is molded along with said block.

5. The adapter of claim 4 wherein said mounting clip comprises a resilient section.

6. The adapter of claim 5 wherein said mounting clip further comprises a retention section connected to said resilient section.

7. The adapter of claim 4 wherein said mounting clip comprises a plurality of resilient sections.

8. The adapter of claim 7 wherein said mounting clip further comprises a retention section connected to each of said resilient sections.

9. An adapter for coupling optical fiber comprising:
    a first adapter body including a port for receiving an optical fiber;
    a second adapter body connected to said first adapter body, the second adapter body including:
        a block having an outer dimension corresponding to a panel cut-out for an interface adapter; and
        a first interface port, for receiving a second optical fiber fitted with an interface connector, mounted to said block,
    wherein said interface connector is ST and said interface adapter is SC.

10. An adapter for coupling optical fiber comprising:
    a first adapter body including at least one first port for receiving an optical fiber;
    a second adapter body including at least one second port for receiving an optical fiber;
    at least one mounting clip integral with said first adapter body, said mounting clip for securing one of said first adapter body and said second adapter body to a panel.

11. The adapter of claim 10 wherein said mounting clip is molded along with said first adapter body.

12. The adapter of claim 10 wherein said mounting clip comprises a resilient section.

13. The adapter of claim 12 wherein said mounting clip further comprises a retention section connected to said resilient section.

14. The adapter of claim 10 wherein said mounting clip comprises a plurality of resilient sections.

15. The adapter of claim 14 wherein said mounting clip further comprises a retention section connected to each of said resilient sections.

16. The adapter of claim 10 wherein said mounting clip includes a projection.

17. The adapter of claim 16 wherein said projection includes a tapered surface.

18. The adapter of claim 16 wherein said projection includes an arcuate surface.

19. The adapter of claim 10 wherein said first adapter body includes a flange having an opening formed therein and said mounting clip extends through said opening.

20. The adapter of claim 10 wherein said mounting clip includes a first portion substantially perpendicular to a central axis of said port and a second portion substantially parallel to the central axis of said port.

21. An adapter for coupling optical fiber comprising:
    a first adapter body including a port for receiving a first optical fiber;
    a second adapter body including a port for receiving a second optical fiber;
    a sleeve for aligning a ferrule in the first optical fiber with a ferrule in the second optical fiber;
    at least one sleeve retainer for positioning said sleeve relative to said first adapter body and said second adapter body; and
    at least one mounting clip integral with said sleeve retainer, said mounting clip for securing one of said first adapter body and said second adapter body to a panel having a cut-out for receiving one of said first adapter body and said second adapter body.

22. The adapter of claim 21 wherein said sleeve retainer is positioned in said first adapter body and further comprising a second sleeve retainer positioned in said second adapter body.

23. The adapter of claim 21 wherein said first adapter body has a first opening formed therein and said second adapter body has a second opening formed therein and said mounting clip is positioned in said first opening and said second opening.

24. The adapter of claim 23 wherein said mounting clip further comprises a lip extending beyond said first opening and said second opening.

25. The adapter of claim 23 wherein said mounting clip further comprises a projection that extends through one of said first opening and said second opening.

26. The adapter of claim 25 wherein said projection further comprises a tapered surface.

27. The adapter of claim 25 wherein said projection further comprises an arcuate surface.

28. An adapter for coupling optical fiber comprising:
    a first adapter body including a port for receiving a first optical fiber, said first adapter including an opening formed therein;

a second adapter body including a port for receiving a second optical fiber, said second adapter including an opening formed therein; and a single mounting clip positioned within the opening in said first adapter body and the opening in the second adapter body, said mounting clip for securing one of said first adapter body and said second adapter body to a panel having a cut-out for receiving one of said first adapter body and said second adapter body.

29. The adapter of claim 28 wherein said first adapter body has a first opening formed therein and said second adapter body has a second opening formed therein and said mounting clip is positioned in said first opening and said second opening.

30. The adapter of claim 29 wherein said mounting clip further comprises a lip extending beyond said first opening and said second opening.

31. The adapter of claim 29 wherein said mounting clip further comprises a projection that extends through one of said first opening and said second opening.

32. The adapter of claim 31 wherein said projection further comprises a tapered surface.

33. The adapter of claim 31 wherein said projection further comprises an arcuate surface.

34. A method of manufacturing an adapter for coupling optical fibers, the adapter including a first adapter body, a second adapter body and at least one sleeve retainer, the method comprising:

assembling the sleeve retainer having an integral mounting clip for securing one of said first adapter body and said second adapter body to a panel having a cut-out for receiving one of said first adapter body and said second adapter body and a first adapter body such that the mounting clip is positioned in an opening in the first adapter body; and joining the first adapter body to the second adapter body.

35. An adapter for coupling optical fiber comprising:

a first adapter body including a port for receiving a first optical fiber and an energy director having a first raised portion substantially perpendicular to a second raised portion; and a second adapter body including a port for receiving a second optical fiber and an opening for receiving said energy director.

36. The adapter of claim 35 wherein said energy director is L-shaped.

37. The adapter of claim 36 wherein:

said first adapter body includes two first L-shaped energy directors and two first L-shaped openings adjacent to said two first L-shaped energy directors;

said second adapter body includes two second L-shaped energy directors and two second L-shaped openings adjacent to said two L-shaped energy directors; and said two first L-shaped energy directors engage said two second L-shaped openings and said two second L-shaped energy directors engage said two first L-shaped openings.

38. An adapter for coupling optical fiber fitted with a connector, the adapter comprising:

an adapter body having a port for receiving the connector, said port including a keyway for aligning the connector in said port, and a groove in the exterior of the adapter body for aligning the adapter body in a panel.

* * * * *